United States Patent

Kozacka et al.

[11] Patent Number: 5,950,707
[45] Date of Patent: Sep. 14, 1999

[54] SEALING ELEMENT FOR A REGENERATIVE HEAT EXCHANGER

[76] Inventors: Wayne R. Kozacka, 26041 Red Corral Rd., Laguna Hills, Calif. 92653; Jackie L. Kaser, 15810 Lindina Dr., Riverside, Calif. 92504

[21] Appl. No.: 09/002,471

[22] Filed: Jan. 2, 1998

Related U.S. Application Data

[63] Continuation of application No. PCT/US97/07423, May 2, 1997
[60] Provisional application No. 60/016,735, May 2, 1996.

[51] Int. Cl.⁶ ............................ F23L 15/02
[52] U.S. Cl. ............................ 165/9; 277/553
[58] Field of Search ............... 165/8, 9, DIG. 20, 165/DIG. 21, DIG. 22, DIG. 24, DIG. 26; 277/355, 553, 931, 932

[56] References Cited

U.S. PATENT DOCUMENTS

| | | | |
|---|---|---|---|
| 2,684,230 | 7/1954 | Hammond | 165/DIG. 24 X |
| 2,761,654 | 9/1956 | Valvo | 165/9 |
| 2,766,970 | 10/1956 | Horn . | |
| 3,016,231 | 1/1962 | Muller et al. | 165/9 |
| 3,703,206 | 11/1972 | Barnard | 165/9 |
| 3,845,545 | 11/1974 | Surrall et al. | 165/9 X |
| 3,977,465 | 8/1976 | Tank | 165/9 |
| 4,084,634 | 4/1978 | Handa | 165/9 |
| 4,143,882 | 3/1979 | Kobayashi | 165/9 X |
| 4,173,252 | 11/1979 | Sakaki et al. | 165/9 |
| 4,791,980 | 12/1988 | Hagar et al. | 165/9 |
| 5,137,078 | 8/1992 | Borowy . | |

FOREIGN PATENT DOCUMENTS

| | | | |
|---|---|---|---|
| 2250790 | 6/1992 | United Kingdom | 277/355 |

OTHER PUBLICATIONS

MacDuff, E.J., Clark, N.D., "Ljungstrom Air Preheater Design and Operation", Reprinted from *Combustion*, Jan. & Mar. 1976, pp. 7–11.

*Primary Examiner*—Christopher Atkinson
*Attorney, Agent, or Firm*—Knobbe, Martens, Olson & Bear, LLP

[57] ABSTRACT

Disclosed is an improved sealing element for a regenerative heat exchanging apparatus, such as a Ljungstrom™-type or a Rothemuhle™-type Preheater. The sealing element is mounted to a radial wall to provide a secure seal between the radial wall and an outer housing of the heat exchanging apparatus and prevent leakage between the hot gas conduit and cool air conduit. In a preferred embodiment, the sealing element includes a reinforced mounting strip that is used to mount the sealing element to the radial wall. The sealing element also includes a sealing strip that maintains a sealing contact between the radial wall and outer housing. A set of bellows is positioned on the sealing element to provide the sealing element with flexibility and resiliency so that the sealing element maintains contact with the sealing surface even when the heat exchanging apparatus experiences warping from thermal distortion.

21 Claims, 6 Drawing Sheets

SEALING ELEMENT FOR A REGENERATIVE HEAT EXCHANGER

RELATED APPLICATIONS

This application is a continuation of International Application PCTUS97/07423, MAY 2, 1997, designating the United States which claims priority under Title 35, USC § 119(e) to U.S. Provisional Application No. 60/016,735, filed May 2, 1996.

BACKGROUND OF THE INVENTION

1. Field of the Invention

The present invention relates to a seal for a regenerative heat exchanging system. More particularly, the present invention relates to a seal that is used to prevent leakage between a hot gas conduit and a cold air conduit of a regenerative air preheater.

2. Description of the Related Art

Regenerative heat exchangers are used to provide preheated air to heavy machinery, such as a fuel burning power plant. Such heat exchangers could be used with any type of machinery that exhausts hot gas and operates more efficiently when supplied with preheated air, such as, for example, chemical processors, refineries, pulp and paper mills, and ships. Typically, two fluid stream passages extend through the heat exchanger. The first passage is a hot gas conduit that communicates with a hot exhaust outlet of the power plant. Hot exhaust gases flow from the power plant exhaust into the hot gas conduit of the heat exchanger. The second passage is a cold air conduit that communicates with a cool air intake passage of the power plant. The cold air conduit feeds pressurized air into the intake passage of the power plant. As is known in the art, the regenerative heat exchanger extracts heat from the exhaust gases of the fuel burning power plant and transfers the heat to the cool air conduit, as described below.

One typical heat exchanger includes a movable heat exchanging body that moves between the hot gas conduit and the cool air conduit. The movable heat exchanging body cyclically collects heat from the hot gas conduit and releases the heat to the cold air conduit. In this manner, the heat from the power plant exhaust is used to warm the air that is being supplied via the intake conduit to the power plant. By supplying the power plant with preheated air, the efficiency of the power plant is improved. Additionally, the heat exchanger is environmentally friendly, as it recycles heat that would otherwise be exhausted into the earth's atmosphere.

The heat exchanging body is typically cylindrical in shape and is located in a sealed relationship within an outer housing of the heat exchanger. The heat exchanging body rotates about a center shaft within the housing of the heat exchanger. A plurality of radial walls extend radially outward from the center shaft and subdivide the heat exchanging body into angular sectors. As the heat exchanging body rotates, the angular sectors are alternately exposed to the hot and cold conduits of the heat exchanging apparatus. As an angular sector is exposed to the hot conduit, it absorbs heat from the exhaust gases of the power plant. The sector then rotatably moves and is exposed to the cold air conduit. The angular sector then releases heat into the cool air that is passed into the power plant intake.

Leakage between the hot gas conduit and the cold air conduit reduces the thermal efficiency of the heat exchanger. It is therefore desirable to seal each of the angular sectors from one another so that gas does not leak between the hot gas conduit and the cold air conduit. Toward this end, seals are mounted on the radial walls at the junctions between the movable heat exchanging body and the housing of the heat exchanging apparatus. These seals are typically mounted on the radial and axial ends of the radial walls. The effectiveness of the seals is extremely important, as a significant amount of the thermal efficiency of the rotary air heater depends on preventing leakage.

The previously described heat exchanger is often referred to as a Ljungstrom™ style preheater. As is known in the art, an alternative design is known as a Rothemuhle® style preheater which has a fixed heat exchanging body with movable conduits. Seals are also required between the fixed heat exchanging body and the movable conduits and suffer from the exact same problems described herein.

In particular, several difficulties are encountered in attempting to adequately seal between the heat exchanging body and the housing in which it is positioned. For example, the seals are typically exposed to harsh operating conditions, such as erosive fly ash and soot. As the heat exchanging body moves with respect to the housing or vice versa, the seals are also exposed to mechanical abuse because the seals are positioned to maintain sliding contact with the sealing surfaces. Consequently, the seals wear down quickly.

Further, the high operating temperatures of the heat exchanging apparatus expose the seals to thermal stresses which often cause the seals to warp. The high operating temperature also causes thermal distortions in the shape of the structural members of the heat exchanging apparatus, such as the housing and center shaft. The distortions in the shape of the seals and the structural members affects the clearance between the seals and the sealing surfaces, often resulting in leakage paths between the hot gas conduit and the cold air conduit. This reduces the thermal efficiency of the heat exchanging apparatus and also reduces the overall efficiency of the system.

Current seal designs do not adequately address these problems. Some seals are made from relatively thick metal which holds up well against corrosion and mechanical abuse. However, such seals are not very flexible and often lose contact with the sealing surface when the structural members of the heat exchanging apparatus thermally distort. Other seals are extremely flexible so that they initially offer better sealing characteristics by expanding or contracting when the structural members thermally distort to maintain contact with the sealing surface. However, such seals hold up poorly to corrosion and mechanical abuse.

Certain prior art seals have been equipped with flexible portions that allow the seal to flex in response to deformations in the heat exchanger. For instance, U.S. Pat. Nos. 3,977,465 and 3,703,206 each disclose seals having resilient portions that allow for straight line deformations. However, such seals are not configured to resiliently respond to the loads that are created by rotation of the casing of the heat exchanging body with respect to the outer housing of the heat exchanger.

There is therefore a need for an improved seal that may be used in conjunction with regenerative heat exchanging apparatuses to prevent gas leakage between the hot and cold conduits. The seal should hold up well against corrosion and mechanical abuse, but should also be flexible so that it maintains contact with the sealing surface even in light of the thermal distortions of the structural members in the heat exchanging apparatus. The seals should be manufactured of a material that is substantial enough to withstand the normal wear, corrosion and mechanical abuses that are typically associated with a regenerative heat exchanging apparatus.

SUMMARY OF THE INVENTION

The present invention relates to a seal assembly that is used to seal the angular sectors of a regenerative heat exchanging apparatus and prevent leakage between the hot gas conduit or exhaust conduit and the cold air conduit or intake conduit. The seal is advantageously configured to provide greater operating efficiency to a heat exchanging apparatus by ensuring positive contact between the heat exchanging body of a heat exchanger and the surfaces dividing the hot gas exhaust conduit and the cold air intake conduit and the sealing surfaces during relative movement therebetween even when exposed to harsh operating conditions and thermal distortion. The seal is preferably manufactured of a material that is highly resistant to corrosion and mechanical abuse.

In a preferred embodiment, the seal assembly is mounted between the outer surfaces of the heat exchanging body and the housing in which the body sits. Preferably, the seal assembly is manufactured of metal and has a substantially elongated planar shape. The seal assembly preferably includes a mounting strip that has an increased thickness to provide mechanical durability to the seal assembly. The mounting strip is used to attach the seal to the outer surfaces of the heat exchanging body. A set of bellows is located on the seal assembly to provide flexibility and resiliency to the shape of the seal assembly. The bellows are interposed between the mounting strip and a sealing strip, which is configured to contact the sealing surface and seal the angular sectors in the heat exchanging body.

In one embodiment, the seal assembly is initially installed with the sealing strip contacting the sealing surfaces. As thermal distortion occurs in the structural components of the heat exchanger, the bellows preferably cause the seal assembly to contract or expand in size and maintain contact with the sealing surfaces.

One aspect of the invention involves a regenerative air preheater comprising a plurality of radial and axial sector plates positioned so as to define an intake conduit and an outlet conduit wherein the intake conduit receives cool air so as to provide air to a power plant and wherein the exhaust conduit receives heated gases that are exhausted from the power plant. A rotor is attached to the plurality of radial and axial sector plates so as to rotate with respect thereto about an axis, wherein the rotor includes one or more heat absorbing sections that are alternatively rotated through the exhaust conduit and the intake conduit so that heat is absorbed in the exhaust conduit and is thereby transferred to the cool air in the intake conduit. At least one seal is mounted on an outer surface of the rotor so as to make contact with an inner surface of the plurality of sector plates during rotation of the rotor so as to reduce the leakage of heat energy between the intake conduit and the exhaust conduit wherein the at least one seal is deformable in a first direction that is normal to the inner surface in response to the at least one seal making contact with the inner surface and wherein the seal is simultaneously biased in a second direction opposite the first direction so that the seal remains in contact with the inner surface over a range of distances between the rotor and the sector plate.

Hence, the seal assembly of the present invention may be used to seal the contact surfaces between a radial wall of a heat exchanging body and the housing of a regenerative heat exchange apparatus during relative movement therebetween. The seal assembly maintains a constant seal between the radial walls and the sealing surfaces during the relative movement even in light of the thermal distortion and expansion that occurs during operation of the heat exchanging apparatus. Moreover, the seal assembly of the present invention is highly resistant to corrosion and mechanical abuse. The seal assembly is also flexible and resilient so that a sliding contact is maintained between the seal assembly and the sealing surface to prevent leakage between the hot gas conduit and the cool air conduit.

BRIEF DESCRIPTION OF THE DRAWINGS

These and other features of the invention will now be described with reference to the drawings of the preferred embodiment of the present invention. The illustrations are intended to illustrate, but not to limit, the invention.

DETAILED DESCRIPTION OF THE PREFERRED EMBODIMENT

Figure 1:
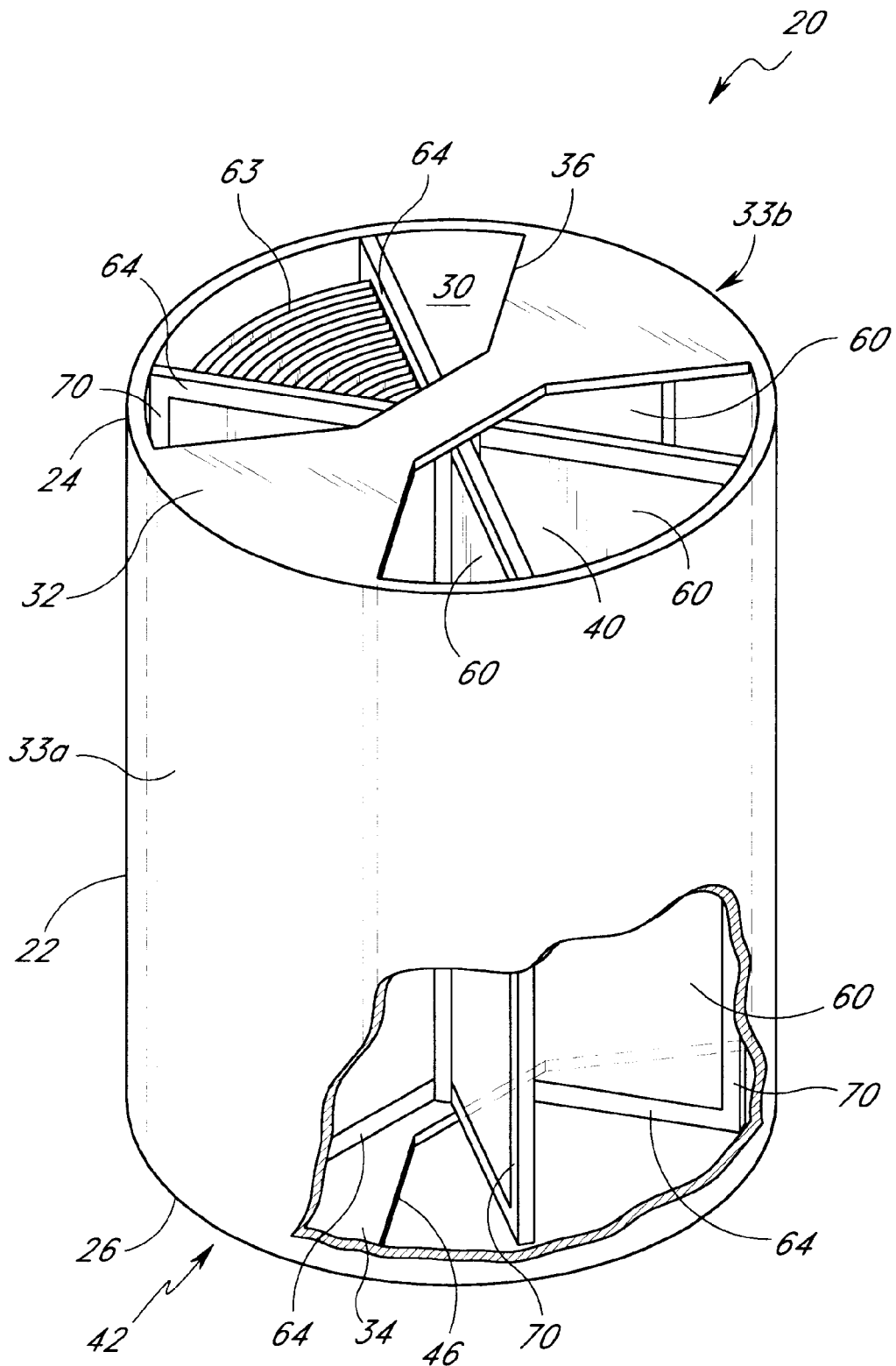
FIG. 1 is a perspective view of a regenerative heat exchanging apparatus in which the seal assembly of the present invention is used.
Figure 2:
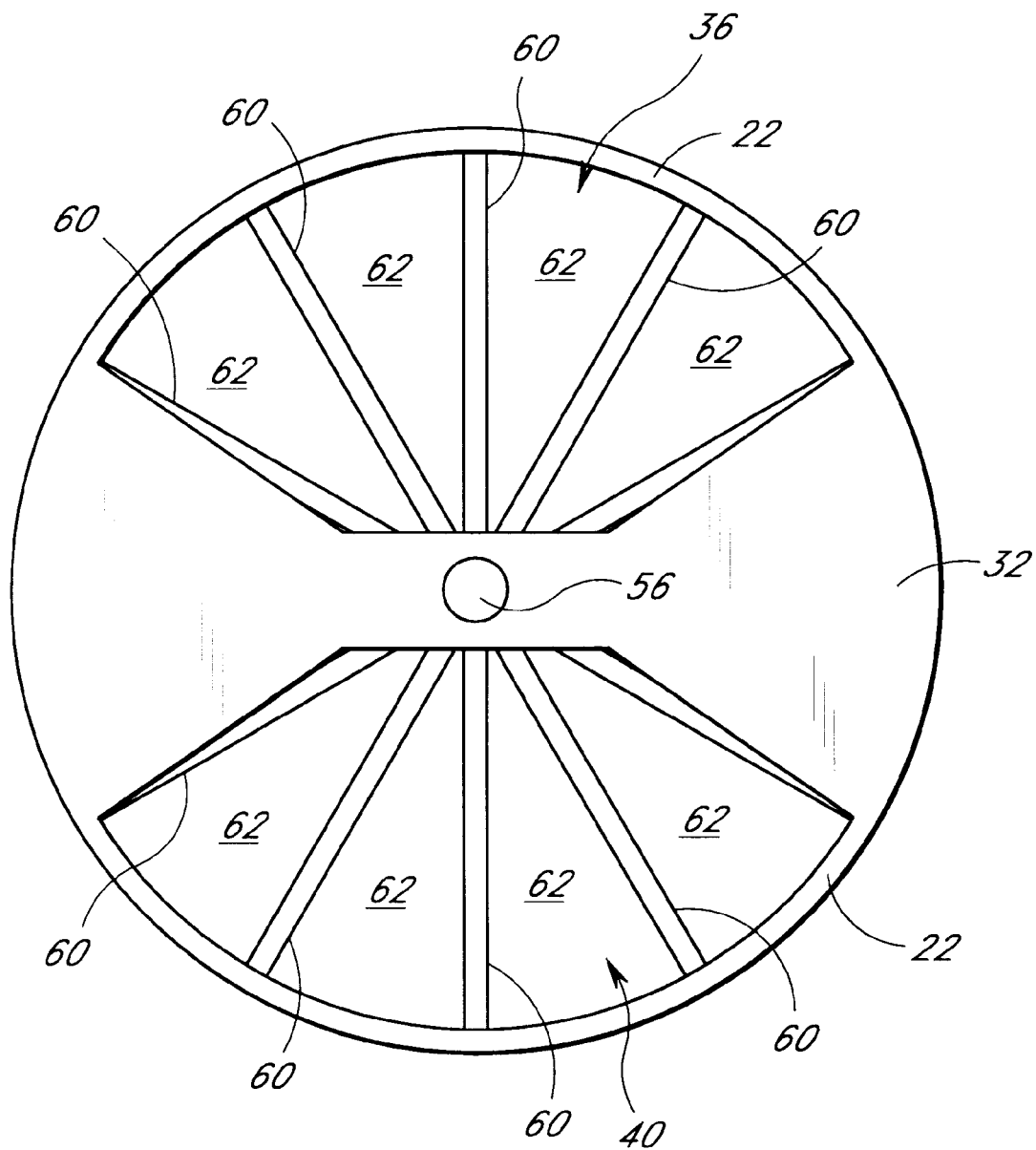
FIG. 2 is a top view of the heat exchanging apparatus shown in FIG. 1.

Reference will now be made to the drawings wherein like numerals refer to like parts throughout. FIG. 1 illustrates a regenerative heat exchanging apparatus 20. FIG. 2 illustrates a top view of the heat exchanging apparatus 20. The heat exchanging apparatus 20 includes an outer housing 22 that has a substantially cylindrical shape. The outer housing 22 has a top end 24 and a bottom end 26. As used herein, the words "top" and "bottom" are with respect to the drawings and are not intended to limit the scope of the invention. In one embodiment, the heat exchanging apparatus 20 is a Ljungstrom™-type Air Preheater that is known to those skilled in the art. In another embodiment, the heat exchanging apparatus 20 is a Rothemuhle®-type Regenerative Air Preheater, as described below.

The outer housing 22 has a side inner surface 30 that defines a hollow interior. The top end 24 of the outer housing 22 includes a top sector plate 32. A bottom sector plate 34 is located on the bottom end 26 of the outer housing 22. The bottom sector plate 34 is preferably aligned parallel to the top sector plate 32. Axial portions 33a and 33b of the housing 30 (indicated by dashed lines in FIG. 1) define axial sector plates of the apparatus 20. The top sector plate 32, the bottom sector plate 34 and the axial sector plates 33a and 33b define the boundary, or interface, between the intake conduit and the outlet conduit of the regenerative air preheater of the preferred embodiment.

In particular, the top sector plate 32 defines an intake or cool air aperture 36 that allows cool air to be passed into the interior of the heat exchanging apparatus 20. An exhaust hot gas aperture 40 is also defined by the top sector plate 32 for allowing hot gas to be passed out of the heat exchanging apparatus 20. The bottom sector plate 34 also defines an intake aperture 42 (not shown) that is aligned below the intake aperture 36. An exhaust aperture 46 on the bottom end 26 is aligned directly below the exhaust aperture 40. Those skilled in the art will appreciate that the location of the inlets and outlets of the heat exchanging apparatus 20 could be reversed. Furthermore, the axis of the heat exchanging apparatus 20 is not limited to a vertical orientation as shown in FIG. 1, but could also be oriented horizontally or at any of a wide variety of orientations.

Figure 3:
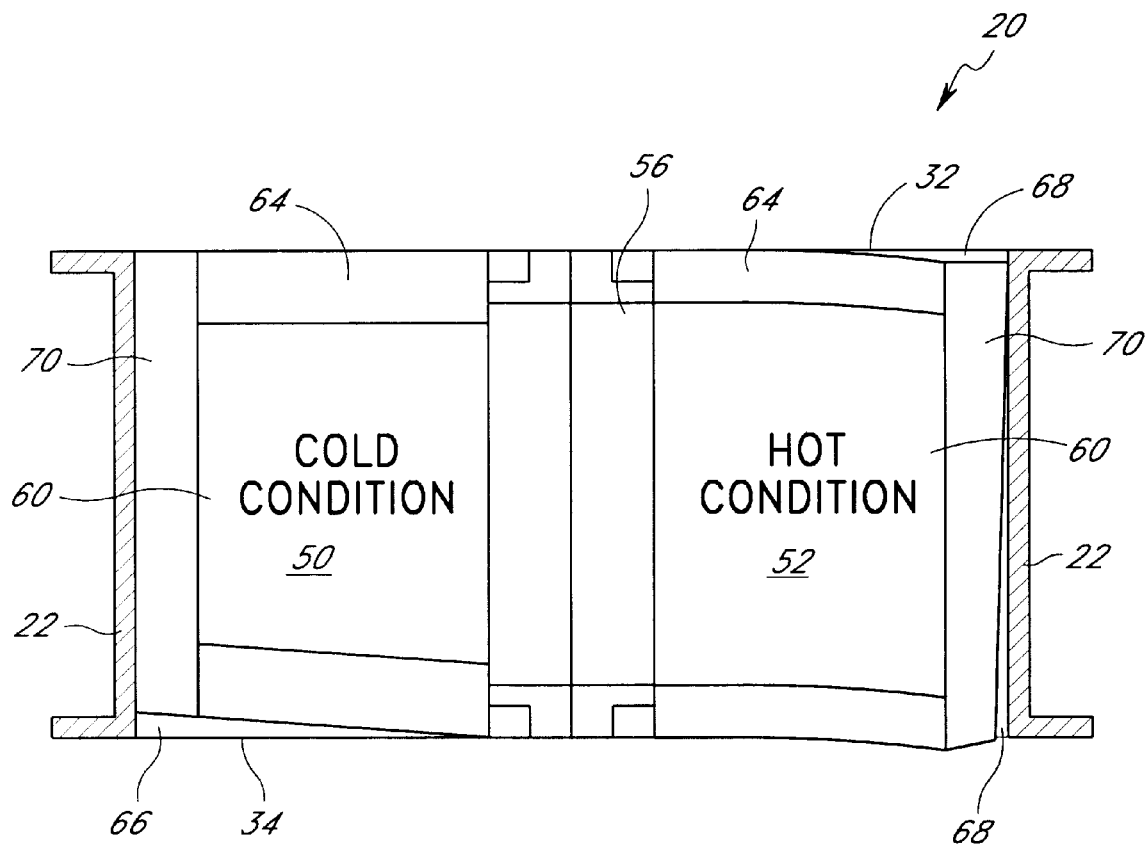
FIG. 3 is a schematic cross-sectional side view of the heat apparatus shown in FIG. 1.

The interior volume of the housing 22 between the top intake aperture 36 and bottom intake aperture 42 defines an intake conduit 50 (FIG. 3). During operation of the heat exchanging apparatus 20, air is fed through the intake conduit 50 into a power plant (not shown), as described below. Similarly, the exhaust gas aperture 40 and the bottom exhaust aperture 46 collectively define an exhaust conduit 52 therebetween that extends within the interior of the housing 22 from the top to the bottom of the heat exchanging apparatus 20. Hot exhaust gases are fed from the power plant through the exhaust conduit 52 during operation of the heat exchanging apparatus, as described below.

As shown in FIGS. 1 and 2, a movable heat exchanging body or rotor 53 is rotatably positioned within the outer housing 22. The heat exchanging rotor includes a rotatable center shaft 56 that is preferably aligned with the axial centerline of the outer housing 22. A plurality of radial walls 60 extend radially outward from the center shaft 56. As best shown in FIG. 2, the radial walls 60 define a plurality of angular sectors 62 within the heat exchanging rotor 53. The angular sectors 62 extend from the top end 24 to the bottom end 26 of the heat exchanging apparatus 20 and communicate at either end with the intake apertures 36, 42 and the exhaust apertures 40, 46. Interposed between each radial wall 62 is a core sector 63. The core sector 63 is typically made of thin corrugated metal that is capable of absorbing heat from the exhaust of the power plant and then transferring this heat to the cool air in the intake conduit 50 in a manner that will be described in greater detail hereinbelow. For ease of illustration, the core sector 63 is shown in only one angular sector 62. In the actual embodiment, a core sector 63 is located in each of the angular sectors 62.

As shown in FIG. 1, a radial seal 64 is mounted along each of the top and bottom edges of the radial walls 60. Preferably, the radial seals 64 are positioned on the radial walls 60 so that the outer edges of the radial seals 64 contact the inner surfaces of the sector plates 32 and 34 when the radial walls 60 are positioned between the sector plates 32 and 34 in the manner shown in greater detail in reference to FIGS. 5A and 5B. In this manner, the radial seals 64 provide a seal between the intake conduit 50 and the exhaust conduit 52, as described below.

As shown in FIG. 1, an axial seal 70 is mounted on the outer radial edge 61 of each of the radial walls 60. The axial seals extend axially along the length of the outer housing 20. The axial seals 70 are preferably positioned such that the outer edges of the axial seals 70 contact the side inner surface 30 of the axial sector plates 33a and 33b. Preferably, the axial seals 70 prevent leakage around the circumference of the housing 22 between the outer radial edges of the radial walls 60 and the side inner surface of the 30 of the axial sector plates 33a and 33b which divide the exhaust conduit 52 from the inlet conduit 50.

During operation of the heat exchanging apparatus 20 as a Ljungstrom™-type Air Preheater, the heat exchanging rotor 53 rotates within the outer housing 22 about the center shaft 56. As the heat exchanging rotor 53 rotates, the angular sectors 62 are alternately aligned with the cool air intake conduit 50 and the hot gas exhaust conduit 52. When aligned with the intake conduit 50, the tops and bottoms of the angular sectors 62 communicate with the top and bottom intake apertures 36 and 42, respectively. Similarly, when aligned with the exhaust conduit 52, the tops and bottoms of the angular sectors 62 communicate with the exhaust apertures 40 and 46. The angular sectors 62 thus function as passageways through which cool air or hot gas flows.

The heat exchanging apparatus 20 functions as a Ljungstrom™-type Air Preheater as follows. One end of the intake conduit 50 is connected to a supply of intake gas, such as air. The other end of the intake conduit 50 is connected to a destination location, such as the cool air inlet passage of a power plant (not shown). The exhaust conduit 52 is also connected to the destination location, such as a hot gas exhaust outlet of the power plant. Any type of piping or duct work known to those skilled in the art may be used to connect the power plant and air supply to the heat exchanging apparatus 20.

Air flows into the intake conduit 50 via the top intake aperture 36. The air flows through the particular angular sector 62 that is aligned with the intake conduit 50. The air then flows out of the heat exchanging apparatus 20 through the bottom intake aperture 42 and into the cool air intake passage of the power plant. The power plant exhausts hot gases into the hot gas conduit 52 through the bottom exhaust aperture 46. The hot gases pass through the particular angular sector 62 that is aligned with the exhaust conduit 52. The hot gases then flow out of the heat exchange apparatus 20 through the top exhaust aperture 40.

The heat exchanging body 53 continually rotates within the outer housing 22 as the above-described process occurs. Thus, each angular sector 62 alternately aligns with the cool air intake conduit 50 and the hot gas exhaust conduit 52 as the heat exchanging rotor 53 rotates. That is, the angular sectors 62 are cyclically exposed to the intake conduit 50 and the exhaust conduit 52. When a particular angular sector 62 is located between the sector plates 32 and 34, the radial seals 64 contact the inner surfaces of the sector plates 32, 34 to prevent leakage between the exhaust conduit 52 and the intake conduit 50. Similarly, the axial seals 70 contact the side inner surface 30 of the axial sector plates 33a and 33b to prevent leakage around the circumference of the housing 22 between the exhaust conduit 52 and intake conduit 50.

When an angular sector 62 aligns with the exhaust conduit 52, the core material 63 (not shown) in the angular sector 62 absorb heat from the exhaust gas in a well known manner. The heat exchanging body 53 continues to rotate so that the particular angular sector 62 eventually becomes aligned with the cool air conduit 50. The heat collecting core then releases heat into the air flowing through the cool air conduit 50 to thereby warm the air.

The heat exchanging apparatus 20 can also be used to illustrate the basic operation of a Rothemuhle®-type Regenerative Air Preheater. The basic structure in this type of preheater is similar to the structure in a Ljungstrom™-type preheater, however, in a Rothemuhle®-type Regenerative Air Preheater the heat exchanging body 53 is fixed and the outer housing 22 rotates about the center shaft 56. Alternatively, a portion of the outer housing 22 or the duct work connecting the heat exchanger 20 to the power plant and air supply could rotate. In a Rothemuhle®-type preheater, the intake conduit 50 and exhaust conduit 52 rotate with respect to the heat exchanging body so that the angular sectors 62 are cyclically exposed to hot exhaust gases and cool air.

In both embodiments of regenerative air preheater, the heat exchanging apparatus 20 transfers heat from the hot exhaust gases of the power plant to the cool air that is being supplied to the power plant. This increases the operating efficiency of the attached power plant.

FIG. 3 is a schematic side view of the heat exchanging apparatus 20 illustrating the thermal deformations that the structural members of the heat exchanging apparatus 20 undergo during operation. The transfer of heat from the hot gas conduit 52 to the cool air conduit 50 creates temperature gradients throughout the heat exchanging apparatus 20. These temperature gradients cause thermal distortions that affect the shapes of the structural members, including the center shaft 56, the radial walls 60, the radial seals 64, and the axial seals 70. The thermal distortions of the various components of the heat exchanging apparatus 20 affects the clearance between the seals 64 and 70 and the sealing surfaces (i.e., the inner surfaces of the sector plates).

As is shown in FIG. 3, the thermal gradients within the heat exchanging apparatus 20 causes the structural components of the heat exchanging apparatus to warp in shape. The left side of the heat exchanging apparatus in FIG. 3 illustrates the shape of the various structural components of the heat exchanging apparatus in an initial cold condition. As shown, a clearance gap 66 is often provided to compensate for the structural distortion that occurs during operation. The right side illustrates the shape of the heat exchanging apparatus in a hot condition. As shown, the thermal distortion causes the radial and axial seals 64, 70 to move away from the outer housing 22 of the heat exchanging apparatus and create leakage gaps 68 between the seals 64, 70 and the outer housing 22. Consequently, gas leaks between the hot gas conduit 52 and the cool air conduit 50 through the leakage gaps 68. This is highly undesirable as it reduces the thermal efficiency of the heat exchanging apparatus 20.

Figure 4:
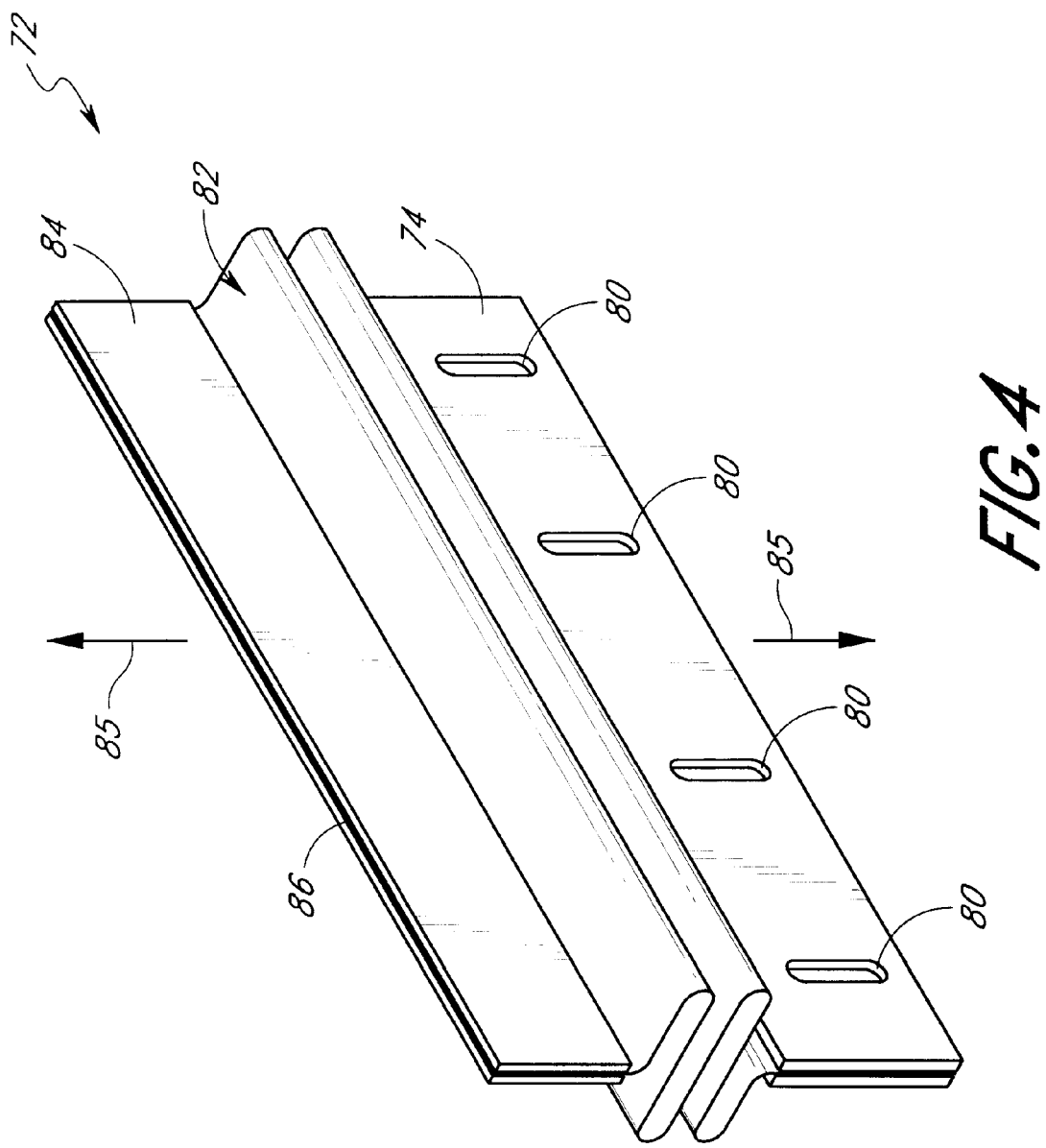
FIG. 4 is a perspective view of a preferred embodiment of the seal assembly of the present invention.

FIG. 4 illustrates a perspective view of an improved seal assembly 72 configured in accordance with a preferred embodiment of the present invention. The seal assembly 72 is configured to be mounted on an outer surface of a radial wall 60 to provide a secure seal between the radial wall 60 and the outer housing 22 and prevent leakage between the hot gas conduit 52 and cool air conduit 50. As discussed below, the seal assembly 72 advantageously maintains a secure seal even when exposed to thermal distortion of the heat exchanging apparatus 20. The seal assembly 72 is also resistant to the harsh operating conditions of the heat exchanging apparatus 20. It will be appreciated that the seal assembly 72 could be mounted to the top or bottom edges of a radial wall 60, in which case it functions as a radial seal 64 to prevent leakage between the radial wall 60 and the sector plates 32, 34. Alternatively, the seal assembly 72 could also be mounted to the outer radial edge of the radial wall 60, in which case it functions as an axial seal 70 between the radial wall 60 and the side inner surface 30 of the outer housing 22. The exact dimensions of the seal 72 will, of course, vary depending upon the specific application and use of the seal.

Although illustrated as being mounted to the radial wall 60, the seal assembly 72 could also be mounted to the outer housing 22 in certain circumstances and remain within the scope of the invention. In such circumstances, the seal assembly seals between the outer housing 22 and the surface of the heat exchanging body 53.

As shown in FIG. 4, the seal assembly 72 includes a mounting strip 74 that has a substantially flat shape and extends along the entire length of the seal assembly 72. In this embodiment, the mounting strip 74 is comprised of a thick metal or two or more strips of metal, preferably steel, that are joined together through spot welding, riveting or any other known manner. The mounting strip 74 preferably has an increased thickness to provide mechanical strength to the seal assembly 72 against warping and distortion. A series of apertures 80 extend through the mounting strip 74. As shown in FIG. 4, each aperture 80 preferably has an elongated shape that extends along the width of the mounting strip. Although the apertures 80 are illustrated as having an elongated shape to facilitate mounting the seals over a range of vertical positions in the manner described below, the apertures 80 may take on any of a wide variety of shapes and remain within the scope of the invention.

The seal assembly 72 also includes a resilient section 82. In the illustrated embodiment, the resilient section 82 has a series of corrugations 83 that extend in and out of a plane defined by the mounting strip 74. The resilient section 82 preferably allows the seal assembly 72 to flex inward and outward in the direction of the arrows 85 and also to rotatably deform in a plane substantially normal to the plane defined by the mounting strip 74. Preferably, the corrugations 83 are configured to compress and allow the resilient section 82 to act as a spring as further described below. The resilient section 82 may thus be exposed to loads so that it compresses and deforms in the same manner that a spring compresses and deforms. When the load is removed, the corrugations 83 cause the resilient section to return to its original shape in the manner of a spring.

The resilient section 82 preferably has a reduced thickness with respect to the thickness of the mounting strip 74. In the illustrated embodiment, the resilient section 82 consists of a single layer of sheet material, such as steel or any of a wide variety of materials known to those skilled in the art. However, the resilient section 82 could also be comprised of any number of layers of material joined together in any of a wide variety of manners, such as through spot welding or riveting. Moreover, the number of corrugations 83 in the resilient section 82 could be varied and remain within the scope of the invention. In a preferred embodiment, the resilient section is approximately 1/32 inch thick.

The seal assembly 72 also includes a sealing strip 84 that extends outward from the resilient section 82 opposite the mounting strip 74. The sealing strip 84 preferably extends in a direction substantially parallel to a plane defined by the mounting strip 74. In a preferred embodiment, the sealing strip 84 has an increased thickness relative to the thickness of the resilient section 82. The sealing strip 84 has a substantially straight outer edge 86. The sealing strip preferably seals the juncture between the inner surface of the sector plates and the outer surface of the rotor 53 and the outer housing 22, as described below.

Figure 5A:
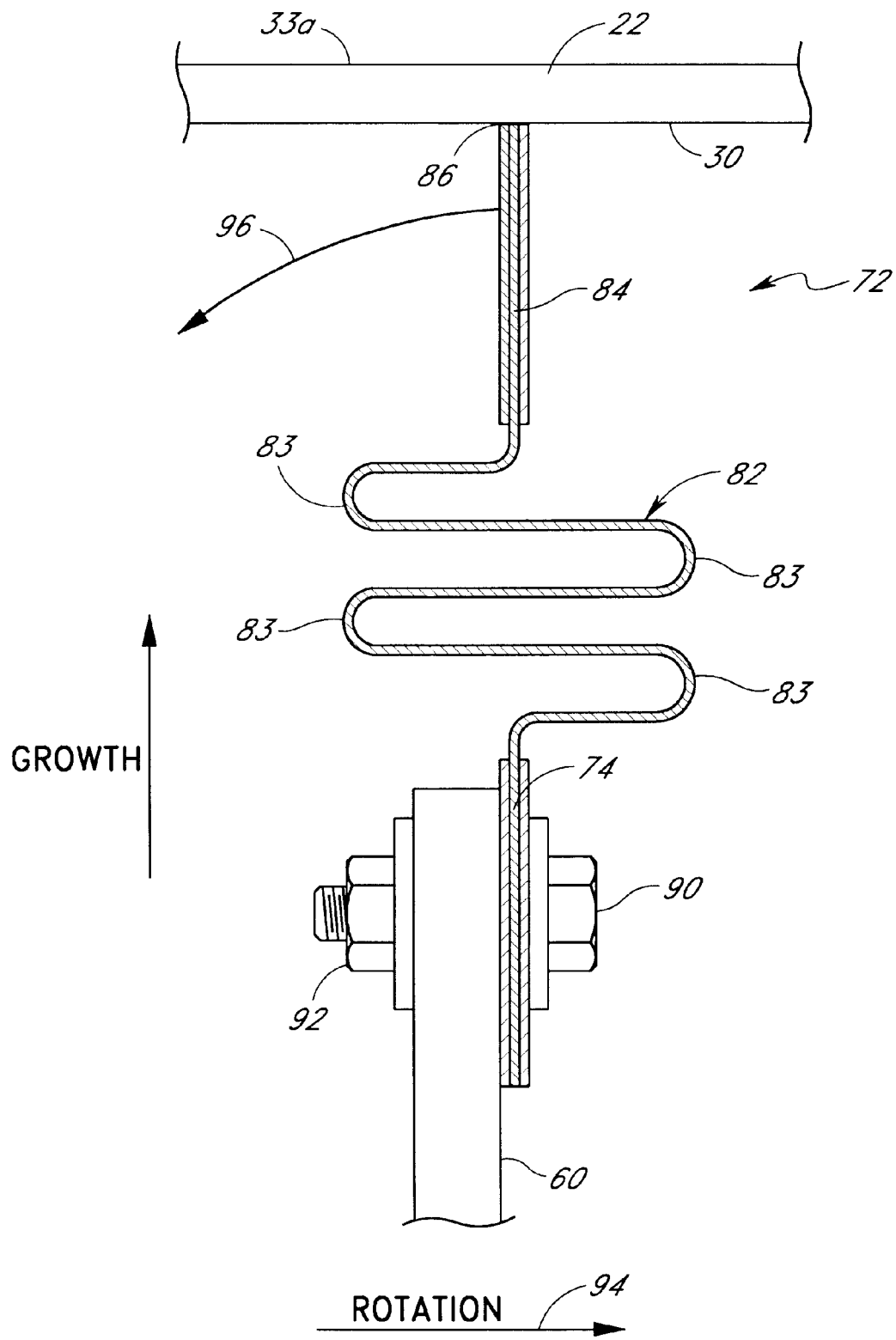
FIGS. 5A and 5B are side views of the seal assembly of FIG. 4 shown mounted to a radial wall of a regenerative heat exchanging apparatus.
Figure 5B:
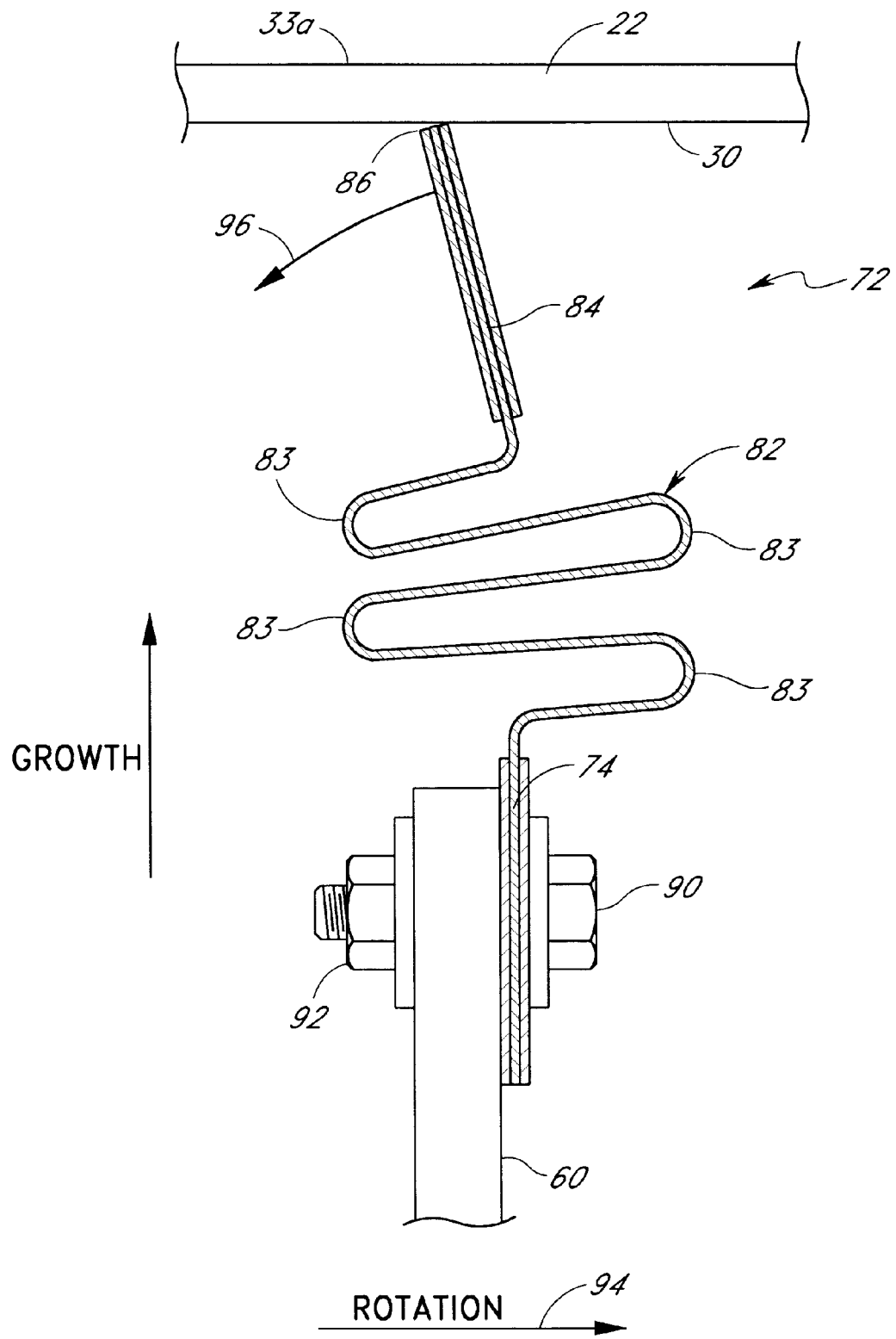

FIGS. 5A and 5B are side views of the seal assembly 72 mounted to the outer surface of a radial wall 60. The seal assembly 72 provides a seal between the radial wall 60 and the inner surface of the sector plates 32, 34 or the inner surface of the axial sector plates 33a and 33b of the outer housing 22. FIGS. 5A and 5B illustrate the seal assembly 72 being used as an axial seal 70. The seal assembly 72 is thus mounted to the outer radial edge of a radial wall 60. However, the seal assembly 72 could also be mounted to the top or bottom edge of the radial wall 60 and used as a radial seal 64 in the manner shown in FIG. 1. As discussed, the radial seal 64 provides a seal at the juncture between the radial wall 60 and the inner surface of the top or bottom sector plates 32, 34.

As shown in FIGS. 5A and 5B, the seal assembly 72 is mounted to the radial wall 60 through the mounting strip 74.

In a preferred embodiment, bolts 90 extend through the apertures 80 in the mounting strip 74 and also extend through corresponding apertures that lie along the edges of the radial walls 60. A nut 92 is screwed onto the bolt 90 to secure the mounting strip 74 flat against the edge of the radial wall 60. It will be appreciated that any of a wide variety of mounting devices could also be used to mount the seal assembly 72 to the radial walls 60.

As shown in FIGS. 5A and 5B, the seal assembly 72 is positioned on the radial walls 60 such that the outer edge 86 of the sealing strip 84 contacts the inner surface 30 of the sector plates 33a and 33b. The sealing strip 84 thus maintains a seal between the radial walls 60 and the outer housing 22 to prevent leakage of gas between the angular sectors 62. The elongated apertures 80 advantageously allow a user to adjust the position of the seal assembly 72 relative to the outer housing 22 by sliding the seal assembly 72 along the length of the apertures 80 until the desired position is achieved.

As discussed above, the structural components of the heat exchanging apparatus 20 undergo thermal distortion as a result of the operational temperature gradients in the heat exchanging apparatus 20. As shown in FIGS. 5A and 5B, the temperature gradients cause the radial walls 60 to undergo thermal growth and expand toward the outer housing 22. Hence, the distance between the outer radial edge of the radial walls 60 and the side inner surface 30 of the outer housing 22 decreases. Advantageously, the resilient section 82 on the seal assembly 72 allows the seal assembly 72 to deflect as the distance decreases, as further described below. The corrugations 83 compress and expand in a spring-like manner to decrease the overall size of the seal assembly 72. The resilient section 82 thus allows the seal assembly to absorb the mechanical stresses created by the reduction in distance between the outer radial edge of the radial walls 60 and the inner surface 30 of the outer housing 22.

Referring to FIG. 5B, as the heat exchanging body or the outer housing 22 rotates in a direction shown by the arrow 94, the load on the sealing strip 84 causes it to deflect in a direction opposite to the direction of rotation, as shown by arrow 96. The corrugations 83 both expand and retract in response to the load so that the sealing strip 84 orients at an angle relative to the mounting strip 74. Specifically, the ends of the corrugations 83 opposite the direction of rotation compress together while the ends of the corrugations facing the direction of rotation expand apart. Advantageously, the corrugations 83 spring back to their normal shape when the load on the sealing strip 84 is removed, so that the sealing strip 84 re-orients parallel to the mounting strip 74. The resilient section 82 thus provides flexibility to the seal assembly 72 to facilitate the rotational deflection of the seal assembly 72 in response to the rotation of the radial wall 60. The outer edge 86 of the sealing strips 84 thus maintains full sliding contact with the sealing surface 30 and thereby maintains a secure seal between the radial walls 60 and the outer housing 22 in the manner that is shown in FIG. 5B.

As shown in FIG. 3, the thermal distortion caused by the temperature gradients may also cause the radial walls to warp such that the distance between the outer radial edge of the radial wall 60 and the side inner surface 30 of the outer housing 22 increases in size. In such a case, the thermal distortion is opposite to that shown in FIG. 5. Preferably, for this type of thermal distortion, the seal assembly 72 is initially installed on the radial wall 60 such that the sealing strip 84 is already in a deflected position in the manner shown in FIG. 5B (i.e., the sealing strip is oriented at an angle relative to the mounting strip 72 with the outer edge 86 contacting the inner surface 30 of the sector plates). In such a state, the resilient section 82 is in a loaded state. As the distance between the outer edge of the radial walls 60 and the inner surface 30 of the outer housing 22 increases, the load on the resilient section 82 is gradually released. The resilient section 82 then expands so that the sealing strip 84 orients parallel to the mounting strip 74. Thus, the contact between the outer edge 86 of the sealing strip 84 and the outer housing 22 is maintained to preserve the seal between the radial walls 60 and the outer housing 22.

As discussed, both the mounting section 74 and the sealing section 84 have increased thicknesses relative to the resilient section 82. Preferably, these sections are thicker so that they are resistant to bending. Hence, any bending of the seal assembly 72 is advantageously concentrated in the resilient section 82 so that the seal assembly may spring back to its original shape. In a preferred embodiment, the sealing section 84 and the mounting section 74 are each approximately 1/16 inch thick.

The seal assembly 72 advantageously provides a secure and reliable seal between the radial walls and the outer housing of a heat exchanging apparatus 20. The seal assembly 72 is configured to rotationally deflect so that the seal assembly 72 maintains contact with sealing surfaces when the thermal distortion occurs, as well as when the movable heat exchanging body rotates. The resilient section advantageously provides flexibility and resiliency to the sealing strip 72 so that it may deform in shape yet maintain a secure seal. Unlike prior art seals, the seal assembly 72 advantageously rotationally deflects in response to the loads produced by rotational movement between the outer housing 22 and the movable heat exchanging body 53. After such loads are removed, the resilient section 82 advantageously springs back into shape so that a secure seal is sustained.

Although the foregoing description of the preferred embodiment of the preferred invention has shown, described, and pointed out the fundamental novel features of the invention, it will be understood that various omissions, substitutions, and changes in the form of the detail of the apparatus as illustrated as well as the uses thereof, may be made by those skilled in the art without departing from the spirit of the present invention. Consequently, the scope of the present invention should not be limited by the foregoing discussion, but should be defined by the appended claims.

What is claimed is:

1. A regenerative air preheater, comprising:

a plurality of radial and axial sector plates positioned so as to define an intake conduit and an exhaust conduit wherein the intake conduit receives cool air so as to provide air to a power plant and wherein the exhaust conduit receives heated gases that are exhausted from the power plant;

a rotor attached to the plurality of radial and axial sector plates so as to rotate with respect thereto about an axis, wherein the rotor includes one or more heat absorbing sections that are alternatively rotated through the exhaust conduit and the intake conduit so that heat is absorbed in the exhaust conduit and is thereby transferred to the cool air in the intake conduit; and at least one seal having a substantially straight outer edge the at least one seal being mounted on an outer surface of the rotor so that said substantially straight outer edge makes contact with an inner surface of the plurality of sector plates during rotation of the rotor so as to reduce the leakage of heat energy between the intake conduit and the exhaust conduit wherein the at least one seal is deformable in a first direction that is opposite the direction of relative movement between said at least one seal and said inner surface in response to the straight outer edge of the at one seal making contact with said inner surface and wherein the seal is simultaneously biased in a second direction opposite the first direction so that the straight outer edge of the at least one seal remains in contact with the inner surface over a range of distances between the rotor and the sector plate while said at least one seal rotates past said inner surface of said plurality of sector plates.

2. The regenerative air preheater of claim 1, wherein the seal is a radial seal.

3. The regenerative air preheater of claim 1, wherein the seal is an axial seal.

4. The regenerative air preheater of claim 1, wherein the seal comprises a mounting section configured to be mounted to an outer surface of said rotor, a sealing section defining said straight outer edge and configured to contact said inner surface, and a resiliently deformable section configured to resiliently expand or contract in a direction normal to said inner surface, said resilient section also configured to rotatably deform about an axis normal to said inner surface.

5. The regenerative air preheater of claim 4, wherin said deformable section comprises convolutions.

6. A regenerative air preheater comprising an outer housing defining a first conduit and a second conduit, a heat exchanging body within said outer housing, said heat exchanging body configured to rotate with respect to said outer housing so that portions of said heat exchanging body are cyclically exposed to said first conduit and second conduit, and at least one seal located between said outer housing and said heat exchanging body, said seal including a mounting section connected to said heat exchanging body, a sealing section having a substantially straight outer edge that is contacting said outer housing, and means for resiliently and rotationally deflecting said seal in a direction opposite to a direction of rotation of said heat exchanging body so that said sealing section maintains contact with said outer housing over a range of distances between said heat exchanging body and said outer housing.

7. The regenerative air preheater of claim 6, wherein said portions of said heat exchanging body are defined by walls that extend radially outward from an axis of rotation of said heat exchanging body.

8. The regenerative air preheater of claim 7, wherein said mounting section of said seal is mounted to an outer edge of said walls.

9. The regenerative air preheater of claim 8, wherein said seal is a radial seal.

10. The regenerative air preheater of claim 8, wherein said seal is an axial seal.

11. The regenerative air preheater of claim 6, wherein said means for resiliently and rotationally deflecting said seal comprises a series of corrugations interposed between said sealing section and said mounting section.

12. A regenerative air preheater comprising:
a housing which defines an intake conduit for providing gases to a destination location and an exhaust conduit for exhausting heated gases from the destination location;
a heat exchanging body having a plurality of sections that absorb heat, the heat exchanging body being mounted so as to be positioned within the intake conduit and the exhaust conduit so that air in the intake conduit and exhaust gases in the exhaust conduit are transferred through the heat exchanging body and wherein the housing and the heat exchanging body define an interface, having a surface, separating the intake an the exhaust conduits wherein the heat exchanging body and the housing are further mounted with respect to each other so that sections of the heat exchanging body are cyclically positioned in the intake and exhaust conduits over time so that the sections are alternatively heated by the exhaust conduit and then exposed to the intake conduit to thereby heat the air in the intake conduit; and
a seal having a substantially straight outer edge the seal being mounted with respect to the housing and the heat exchanging body so that the straight outer edge of the seal extends along the interface so as to inhibit exhaust gases and air from leaking between the intake conduit and the exhaust conduit via the interface, wherein the straight outer edge of the seal periodically contacts the surface of the interface as a result of relative motion between the heat exchanging body and the housing and bends in a direction that is opposite to the direction of relative motion and wherein the seal is biased in the direction of relative motion between the heat exchanging body and the housing so that the straight outer edge of the seal maintains contact between the heat exchanging body and the housing over a range of distances at the interface between the heat exchanging body and the housing during operation of the air preheater.

13. The preheater of claim 12, wherein the heat exchanging body moves with respect to the housing during operation of the preheater as a result of thermal expansion so as result in a gap at the interface having a range of distances.

14. The preheater of claim 13, wherein the heat exchanging body is comprised of a rotor that rotates within the housing.

15. The preheater of claim 14, wherein the seal is mounted on an outer surface of the rotor and the surface of the interface is a surface of the housing.

16. The preheater of claim 15, wherein the seal includes a mounting section that is attached to the outer surface of the rotor, a sealing section which contacts the interface surface on the housing, and a resilient section interposed between the mounting section and the sealing section which allows the sealing section to bend in a first direction while simultaneously being biased in a second direction opposite the first direction.

17. The preheater of claim 16, wherein the resilient section is comprised of at least one S-shaped convolution wherein an opening in the S-shaped convolution positioned in the first direction expands as a result of contact between the seal and the interface surface and wherein an opening positioned away from the first direction contracts as a result of contact between the seal and the interface.

18. The preheater of claim 17, wherein the expansion and contraction of the openings provides a bias so as to bias the seal in the first direction.

19. The preheater of claim 18, wherein the seal section and the mounting sections have a greater thickness than the resilient section so as to concentrate bending of the seal in the resilient section.

20. The preheater of claim 16, wherein the seal is positioned on a radial surface of the rotor and wherein the interface surface is a surface of the housing which extends parallel to a radius of the rotor.

21. The preheater of claim 16, wherein the seal is positioned on an axial surface of the rotor and wherein the interface surface is a surface of the housing which extends parallel to the axis of the rotor.

* * * * *